(12) United States Patent
Fowles (10) Patent No.: US 7,502,888 B2
(45) Date of Patent: Mar. 10, 2009

(54) SYMMETRIC MULTIPROCESSOR SYSTEM

(75) Inventor: Richard G. Fowles, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 639 days.

(21) Appl. No.: 11/348,686

(22) Filed: Feb. 7, 2006

(65) Prior Publication Data

US 2007/0186044 A1    Aug. 9, 2007

(51) Int. Cl.
*G06F 9/40* (2006.01)
*G06F 12/38* (2006.01)

(52) U.S. Cl. ........................... 711/130; 712/216
(58) Field of Classification Search ............. None
See application file for complete search history.

(56) References Cited

U.S. PATENT DOCUMENTS

| | | | |
|---|---|---|---|
| 6,295,600 B1 * | 9/2001 | Parady | 712/228 |
| 6,779,049 B2 | 8/2004 | Altman et al. | |
| 6,904,594 B1 | 6/2005 | Berry et al. | |
| 6,970,982 B2 | 11/2005 | Altman et al. | |
| 2005/0055490 A1 * | 3/2005 | Widell et al. | 711/1 |
| 2007/0214342 A1 * | 9/2007 | Newburn et al. | 712/216 |

* cited by examiner

*Primary Examiner*—Hyung S Sough
*Assistant Examiner*—Duc T Doan (57) ABSTRACT

Systems, methods, and device are provided for symmetric multiprocessor (SMP) systems. One method embodiment includes creating a child process for each processor in the SMP. An event address register (EAR) associated with each processor is used to record information relating to cache misses. The EAR records are analyzed for each processor and a bit vector is created for each byte of cache line that is shared by multiple processors.

29 Claims, 9 Drawing Sheets

SAMPLE DISTINCT CACHE LINE MISS DATA

| DATA ADRS | OFFSET | CNT | CPU # |
|---|---|---|---|
| e0000001.00e54d00 | 0 | 2 | 3 |
| e0000001.00e54d02 | 2 | 1 | 0 |
| e0000001.00e54d02 | 2 | 9 | 2 |
| e0000001.00e54d04 | 4 | 8 | 0 |
| e0000001.00e54d04 | 4 | 23 | 1 |
| e0000001.00e54d04 | 4 | 1 | 1 |
| e0000001.00e54d04 | 4 | 10 | 2 |
| e0000001.00e54d04 | 4 | 1 | 3 |
| e0000001.00e54d0c | 12 | 1 | 3 |
| e0000001.00e54d10 | 16 | 2 | 3 |

SYMMETRIC MULTIPROCESSOR SYSTEM

BACKGROUND

One of the factors that can limit the performance scaling of large symmetric multiprocessor (SMP) systems is the occurrence of highly referenced data that is shared amongst multiple processors in the system. In SMP systems there is some sort of cache coherency protocol that is enforced to guarantee a consistent view of memory contents by all processors in the system. The most popular protocols in the industry are modified, exclusive, shared, invalid (MESI) and modified, owned, exclusive, shared, invalid (MOESI). These are commonly known as write once protocols as the occurrence of the first write to a cache line will cause all other cache resident copies of this line to be invalidated.

Shared data can be classified into two broad categories. The first is true sharing, a situation in which the data memory locations are being shared by two or more processors in the system. This type of sharing is common to a large class of commercial applications. The second form of sharing is commonly referred to as false sharing. This is a situation in which two or more processors are referencing totally independent data items that just happen to reside on the same cache line as a happenstance. There are a variety of situations that can lead to false cache line sharing; however a common source is the operating system. In this instance the sharing is generally a result of global variable access when the operating system executes on various processors as part of its normal system operation.

The cache line invalidation that occurs as a result of the cache coherency protocol enforcing a consistent view of memory has the unintended result of causing the cache miss rates for processes that share data to increase. The increase in cache miss rate can be extremely high for processes that have high reference rates to shared data. The increased miss rates in turn increase bus, and possibly memory, utilization thereby increasing apparent bus (memory) latency. The combination of increased miss rate and increased latency has the net effect of degrading the performance of processes that share data, which progressively increases as the number of processors increase thereby limiting performance scaling.

Given the serious performance impact that can result from false sharing as well as highly referenced truly shared structures one would expect that there are would be effective means for identifying the data structures that are responsible for either or both types of data sharing. Unfortunately, current techniques generally require heavily obtrusive compiler inserted instrumentation. While this may work for workloads comprised of a collection of homogenous processes it tends to be every ineffective for heterogeneous workloads. At best the software instrumentation approach is heavily obtrusive and generally can not be used at customer sites, as this would require taking the application down to install instrumented software. If the desire is to be able to identify the sources and true/false data sharing without any software or performance impacts then another approach has to be developed.

DETAILED DESCRIPTION

Embodiments are described for improved performance in symmetric multiprocessor (SMP) systems. One embodiment includes a symmetric multiprocessor (SMP) system having program instructions storable in memory and executable by the processor to; create a child process for each processor in the SMP, use an event address register (EAR) associated with each processor to record information relating to cache misses, analyze the EAR records for each processor, and create a bit vector for each byte of cache line that is shared by multiple processors.

According to various embodiments the program instructions can execute such that the child process associated with each processor configures a data EAR (DEAR) in a performance monitoring unit (PMU) for its associated processor to record cache misses that are not serviced by cache local to its associated processor. The particular processor's DEAR information is recorded in a private array of a shared memory segment configured by a parent process. Each child process can record DEAR information when a DEAR signal is received until a particular event, e.g., expiration of a configurable time period or until a particular number of DEAR records have been recorded, and then send a termination signal a parent process which created the child processes.

In various embodiments, each child process can evaluate a signaling rate of the associated processor and adjust DEAR parameters to maintain a particular overhead rate. Once the parent process receives the termination signal from each child process, the program instructions can execute to sort recorded DEAR information by data address, processor identification, cache miss count, and instruction address information to produce an list of a number of distinct cache lines that were read. The program instructions can then use a virtual address space (VAS) model for a given operating system to create an index over the sorted DEAR information for distinct sharable cache lines according to the VAS model for the given operating system.

Further, program instructions are executable to sort the distinct sharable cache lines by data address, miss count, processor count, and instruction address information to produce an index list of a number of distinct memory cache lines that were shared by multiple processors. The program instructions can then create a bit vector for each byte of cache line that is shared by multiple processors across the system, wherein the bit vector records all processors that referenced any byte within a distinct memory cache line and scan the DEAR records for each shared distinct memory cache line.

When all DEAR records associated with a current distinct memory cache line have been scanned, a population count can be performed for each bit vector associated with a byte address within a cache line.

The embodiments described herein thus include program instructions which can be executed to generate a sharing report. In various embodiments, generating the sharing report includes program instructions executing to; identify a false sharing if all byte addresses are distinct to individual processors, identify a true sharing if all offsets used are seen by multiple processors, and when there is a combination of a number of byte being distinct to individual processors and a number of offset being seen by multiple processors, use cache miss count information to discern whether a highly shared structure exist.

Figure 1:
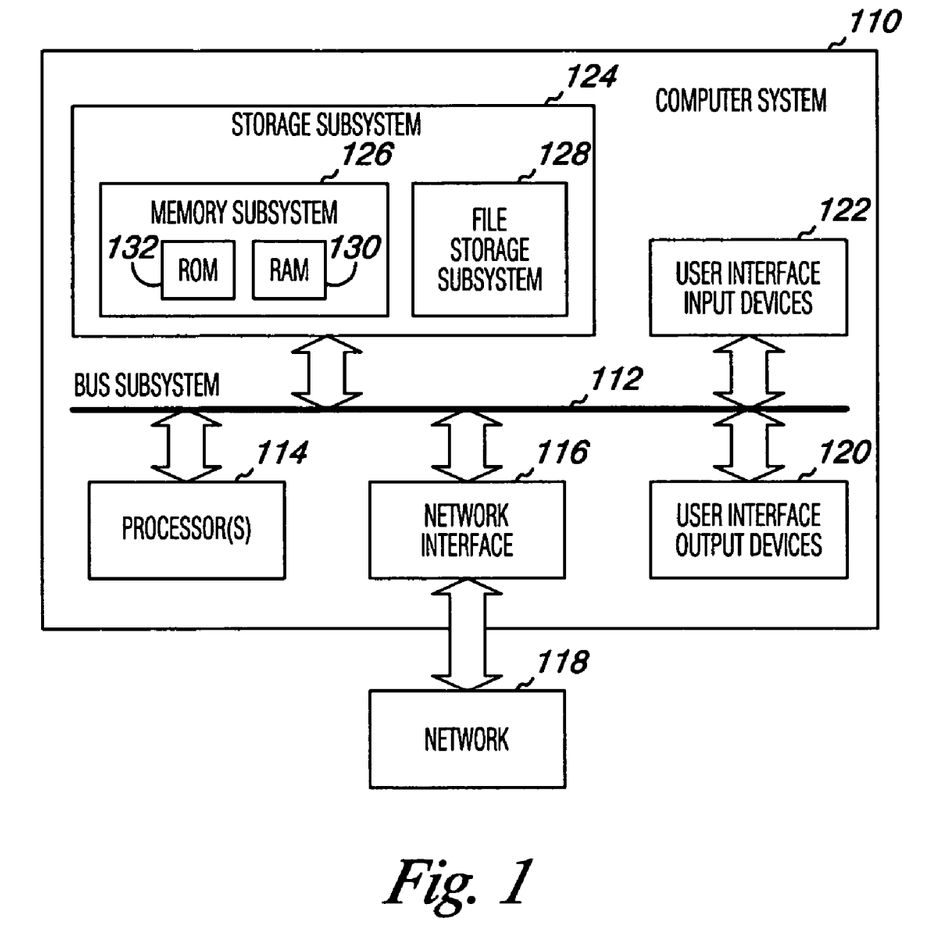
FIG. 1 is a block diagram of a computer system suitable to implement embodiments of the invention.

FIG. 1 is a block diagram of an example computer system 110 suitable to implement embodiments of the invention. Computer system 110 includes at least two processors 114 that communicate with a number of other computing components via bus subsystem 112. These other computing components may include a storage subsystem 124 having a memory subsystem 126 and a file storage subsystem 128, user interface input devices 122, user interface output devices 120, and a network interface subsystem 116, to name a few. The input and output devices allow user interaction with computer system 110. Network interface subsystem 116 provides an interface to outside networks, including an interface to network 118 (e.g., a local area network (LAN), wide area network (WAN), Internet, and/or wireless network, among others), and is coupled via network 118 to corresponding interface devices in other computer systems. Network 118 may itself be comprised of many interconnected computer systems and communication links, as the same are known and understood by one of ordinary skill in the art. Communication links as used herein may be hardwire links, optical links, satellite or other wireless communications links, wave propagation links, or any other mechanisms for communication of information.

User interface input devices 122 may include a keyboard, pointing devices such as a mouse, trackball, touchpad, or graphics tablet, a scanner, a touchscreen incorporated into a display, audio input devices such as voice recognition systems, microphones, and other types of input devices. In general, use of the term "input device" is intended to include all possible types of devices and ways to input information into computer system 110 or onto computer network 118.

User interface output devices 120 may include a display subsystem, a printer, a fax machine, or non-visual displays such as audio output devices. The display subsystem may be a cathode ray tube (CRT), a flat-panel device such as a liquid crystal display (LCD) and/or plasma display, or a projection device (e.g., a digital light processing (DLP) device among others). The display subsystem may also provide non-visual display such as via audio output devices. In general, use of the term "output device" is intended to include all possible types of devices and ways to output information from computer system 110 to a user or to another machine or computer system 110.

Storage subsystem 124 can include the operating system "kernel" layer and an application layer to enable the device to perform various functions, tasks, or roles. File storage subsystem 128 can provide persistent (non-volatile) storage for additional program and data files, and may include a hard disk drive, a floppy disk drive along with associated removable media, a compact digital read only memory (CD-ROM) drive, an optical drive, or removable media cartridges. Memory subsystem 126 typically includes a number of memories including a main random access memory (RAM) 130 for storage of program instructions and data, e.g., application programs, during program execution and a read only memory (ROM) 132 in which fixed instructions, e.g., operating system and associated kernel, are stored. As used herein, a computer readable medium is intended to include the types of memory described above. Program embodiments as will be described further herein can be included with a computer readable medium and may also be provided using a carrier wave over a communications network such as the Internet, among others. Bus subsystem 112 provides a mechanism for letting the various components and subsystems of computer system 110 communicate with each other as intended.

Program embodiments according to the present invention can be stored in the memory subsystem 126, the file storage subsystem 128, and/or elsewhere in a distributed computing environment as the same will be known and understood by one of ordinary skill in the art. Due to the ever-changing nature of computers and networks, the description of computer system 110 depicted in FIG. 1 is intended only as one example of a computing environment suitable for implementing embodiments of the present invention. Many other configurations of computer system 110 are possible having more or less components than the computer system depicted in FIG. 1.

With software optimization as a major goal, monitoring and improving software execution performance on various hardware is of interest to hardware and software developers. Some families of processors include performance monitoring units (PMUs) that can monitor up to several hundred or more micro-architecture events. For example, Intel's® Itanium® family of processors, i.e., the Itanium Processor Family (IPF), have anywhere from 400 to 600 low level micro-architecture events that can be monitored by the PMU. However, these events are so low level that it is not possible for a normal user to gleam any insight as to the causes of poor processor execution performance. This is compounded by the fact that producing any high-level performance metric involves the simultaneous monitoring of more events than there are counters available in the PMU.

Embodiments of the present disclosure involve a collaborative hardware/software interaction. As one example, the hardware provided by the Intel IPF in particular provides a means to achieve embodiments discussed herein. In such embodiments, the useful mechanism available within the IPF is the event address register (EAR). The EAR is associated with the PMU and can be configured to capture information associated with cache misses. In particular the EAR can capture the instruction pointer (IP), i.e., the memory address of the data access that lead to the miss being detected. The EAR also provides a measure of the latency required to satisfy the miss from the system, i.e., either memory or the cache of some other processor in the system which in commonly known as a cache-to-cache (C2C) transfer. In current IPF processors there are two EAR facilities, one is designed to monitor instruction cache misses, and the second is intended for-monitoring data cache misses. The operational embodiment description which follows relates to use of the later, e.g., the data EAR (DEAR).

As noted above, the DEAR plays a role in the embodiments discussed in that the DEAR provides part of the information used to identify the sources of cache line sharing. However, the DEAR information alone is incomplete. Accordingly, embodiments include additional information that is provided by the operating system. This additional information includes the process identifier (PID), memory region identifier (RID) and some type of interface to the operating system that takes a virtual address/RID pair as input and returns the associated physical address. One design embodiments uses a dynamically loaded kernel module (DLKM) that accesses the page table structures in memory to perform this translation. As described in more detail below, with the combination of information provided by the DEAR augmented with information provided by the operating system it is possible to develop a PMU control process and data reduction algorithm (also referred to herein as a "measurement tool" and/or "program embodiments/instructions") which will identify the source and type (True/False) of data sharing with reduced overhead and without custom software.

According to various embodiments, a process is provided that can control and monitor the PMU's of all processors configured in the SMP system. Certain hardware requirements dictate that the code which configures a specific PMU must execute on the processor to which the PMU is associated. Another requirement may be that the measurement tool execute as a user level process. Within this context, embodiments of the present disclosure are described being implemented as multiple processes in a parent-child relationship. The program embodiments (or "tool") appear(s) to the system user as a simple user level command which can be executed with a variety of command line arguments that qualify how a particular measurement is to be made. The command line options that are available for the data sharing measurement can include measurement observation time, the path to a specific executable that the user is interested in examining in detail, and an optional parameter for determining the number of samples that is sufficient to terminate the measurement. For example, the sample count option is used to terminate a measurement early when it is known that a certain sample size will be sufficient to analyze a particular issue and when the event rate is unknown.

Upon issuance of the above described command, and any associated command line options, the tool can proceed to perform the measurement without any further user input. The first action the tool, e.g., "executing program instructions", takes is to process any command line options. Next the program instructions execute to determine the number of processors in the system, the processor type, memory size, firmware revision level, etc. Based upon this information the tool creates tables of PMU configuration information which will ultimately be used to configure the PMU DEAR to collect the information used for the data sharing measurement. The tool then proceeds to allocate a shared memory segment (e.g., 208 described in connection with FIG. 2) that is sufficient to record all the samples that will be collected from all processors in the system. This shared data segment is divided into regions (e.g., regions #0, #1, #2, . . . , #N in 208 described in connection with FIG. 2) that will be private to the PMU of each processor, where "N" represents the number of processors in the system. This approach ensures that there will be no extraneous additional shared data accesses caused by the measurement process as there will only be a single processor writing to its privately reserved potion of the shared data segment during the data acquisition phase of the data sharing measurement.

At this point the tool interrogates the operating system to build a table of all the processes currently active in the system. This table contains all information needed to support the data sharing measurement. It contains the PID, parent process identifier (PPID), object/command name and run string, RID table, priority, etc. When the list is complete a hash table can be created over the list to provide a means of quickly locating the information associated with a particular PID. A secondary list is created that links all processes that have the same executable. This is provided so that if the user provides an object name in the command line the tool can associate DEAR records with a specific executable and by transitivity to its symbol if the object was provided.

The tool proceeds by opening the operating system executable and reading in the symbol table which is in the form of a linear list. An index array is created over the list which is then used to sort the list by ascending instruction address. It is now possible to find the symbol associated with a specific instruction array by performing a binary search using the index array. The index array is then associated with a pseudo process that is used to represent the operating system in the process table. Processing of a user supplied command line object is processed much the same way. In this case the name file specified would be opened and its symbol table read. An index array is created over the symbol table, it is then sorted and then the symbol table is associated with the list of PIDs that are associated with the named object.

Figure 2:
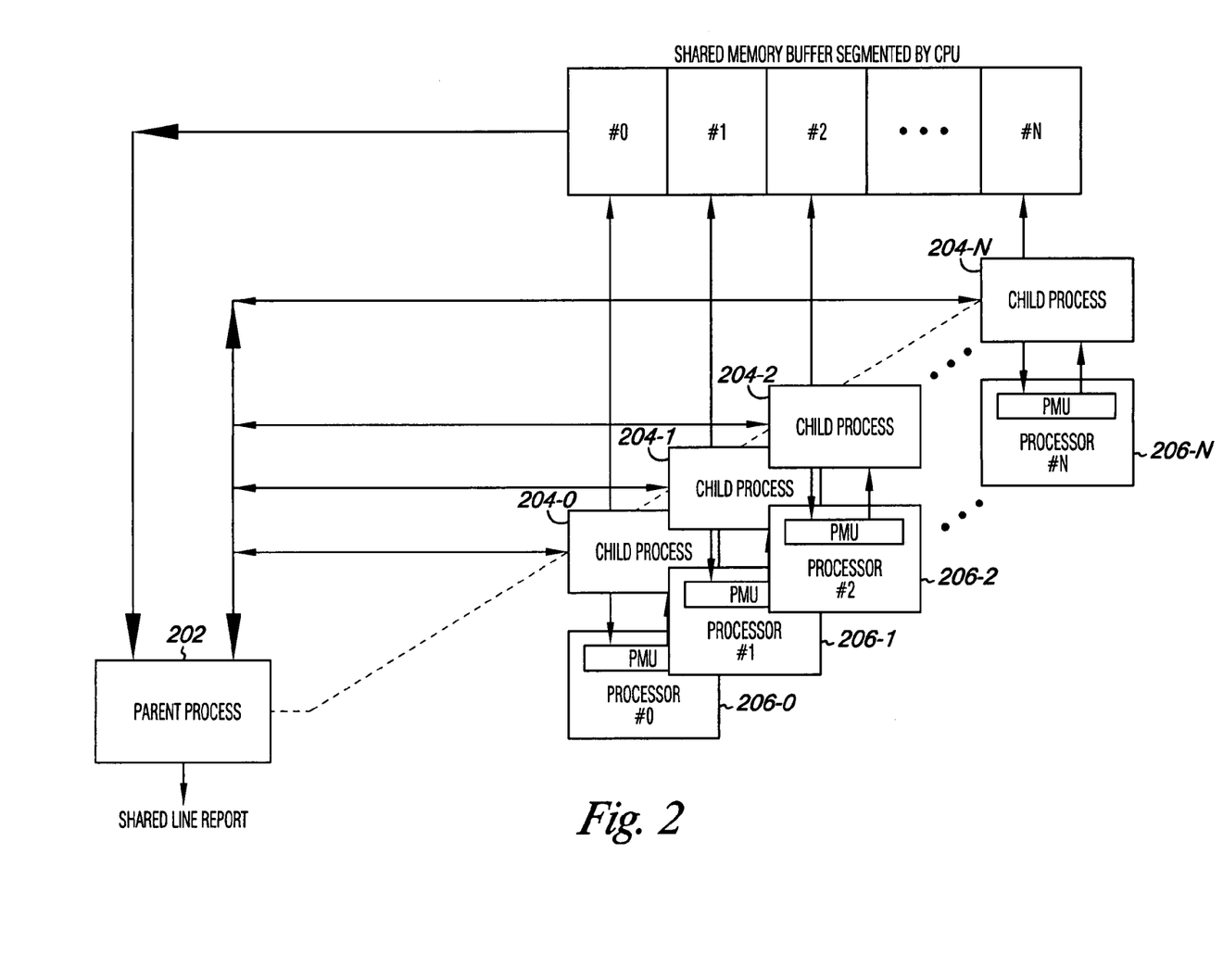
FIG. 2 is an embodiment illustrating a parent process creating a child process for each processor in a symmetric multiprocessor (SMP) system and providing a shared memory buffer segmented by processor.

FIG. 2 is an embodiment illustrating a parent process 202 creating a child process, 204-0, 204-1, 204-2, . . . , 204-N, for each processor, 206-0, 206-1, 206-2, . . . , 206-N, in a symmetric multiprocessor (SMP) system and providing a shared memory buffer segmented, #0, #1, #2, . . . , #N, by processor, e.g., 206-0, 206-1, 206-2, . . . , 206-N. Continuing from the description above, the tool has completed the creation and initialization of all data structures required to support the data sharing measurement. It is now ready to create the child processes, 204-0, 204-1, 204-2, . . . , 204-N, that will control the PMU within each processor, 206-0, 206-1, 206-2, . . . , 206-N. The first action is to create an inter-process communication path, i.e., a unix pipe. Then a fork operation is performed by the parent 202 which causes the creation of child processes, 204-0, 204-1, 204-2, . . . , 204-N, which inherit process attributes of the parent process 202. A fork operation is performed for each processor, 206-0, 206-1, 206-2, . . . , 206-N, in the system. When a child process, 204-0, 204-1, 204-2, . . . , 204-N, has been created for each processor, 206-0, 206-1, 206-2, . . . , 206-N, in the system the parent process 202 closes the transmit channel of the communications pipe established between each child process, 204-0, 204-1, 204-2, . . . , 204-N, and the parent process 202. The parent process 202 then issues a read on the pipe which will cause the parent process 202 to sleep until one or more child processes performs a write to the pipe.

When the child process, 204-0, 204-1, 204-2, . . . , 204-N, starts executing it closes the read channel of the communications pipe that the parent process 202 created. The transmit channel is left open so the child process, 204-0, 204-1, 204-2, . . . , 204-N, can send status messages to the parent 202. Next the child process, 204-0, 204-1, 204-2, . . . , 204-N, binds itself to the processor, 206-0, 206-1, 206-2, . . . , 206-N, the parent had identified this child process, 204-0, 204-1, 204-2, . . . , 204-N, to monitor. When the child process, 204-0, 204-1, 204-2, . . . , 204-N, confirms that it has successfully bound to its designated processor, 206-0, 206-1, 206-2, . . . , 206-N, it configures the respective PMU to make the specified measurement (shown further in FIG. 3).

Figure 3:
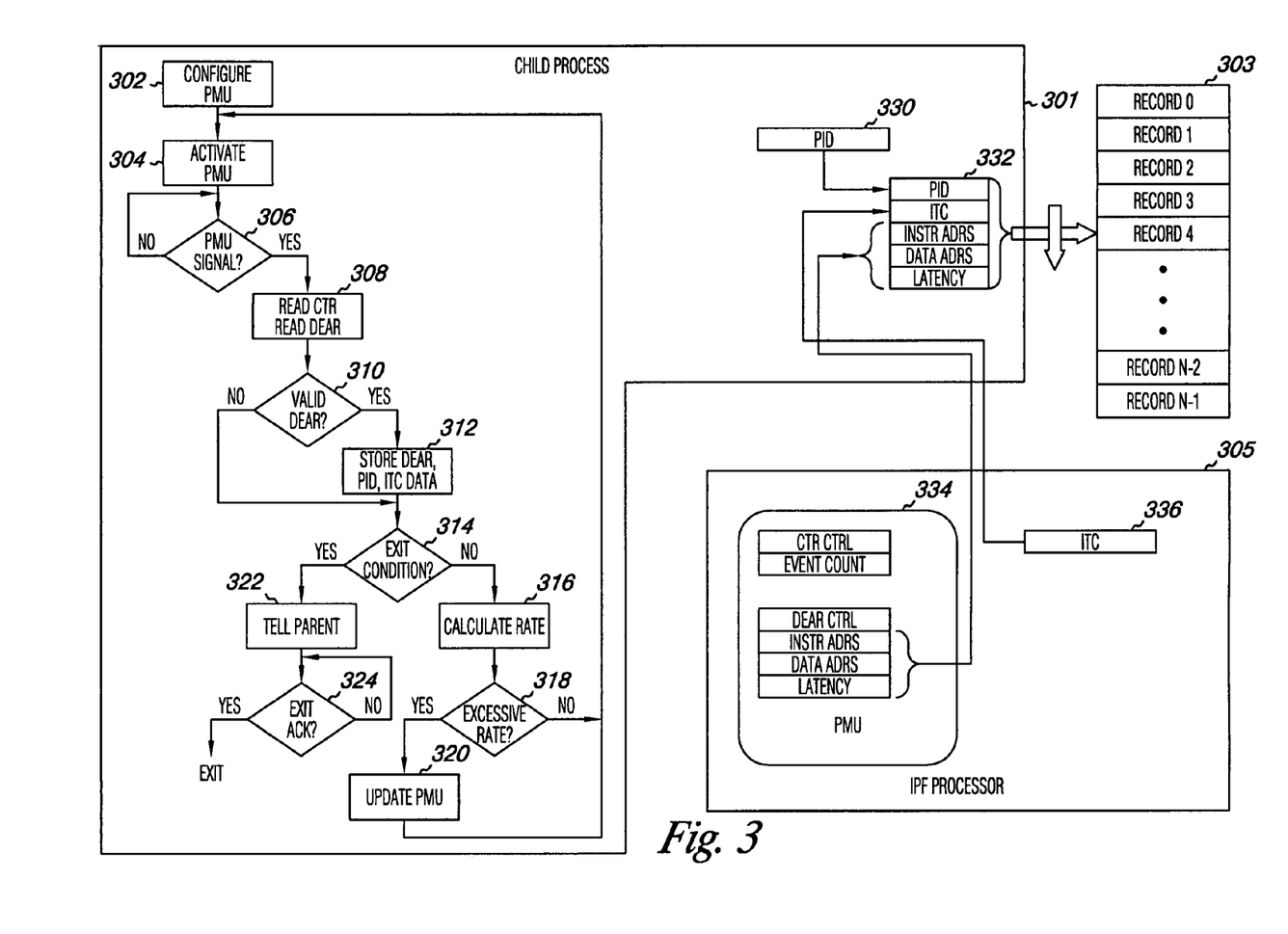
FIG. 3 is an embodiment illustrating a methodology and data structures associated with a child process of FIG. 2 relative to its associated processor.

FIG. 3 is an embodiment illustrating a methodology and data structures associated with a child process 301, e.g., 204-0, 204-1, 204-2, . . . , 204-N of FIG. 2, relative to its associated processor 305. As shown in FIG. 3, a method embodiment begins with configuring the PMU 302. The parent, e.g., 202 in FIG. 2, has previously created a PMU configuration data structure 332 (local to the child process) which was obtained from the operating system 330. This was inherited by each child process which now initializes the various PMU registers, e.g., 334, of the associated processor, e.g., 206-0, 206-1,

206-2, ..., 206-N of FIG. 2, using this configuration data structure which is in fact an image of the PMU register set. The image contains register values that cause the PMU to count DATA_EAR_EVENTS and CPU_CYCLES. The DEAR control register is configured to monitor all data cache load misses that have a latency of greater than the largest read latency existing for any level cache in the cache hierarchy. Thus, in essence, the embodiments are only monitoring load misses that are either satisfied by memory or the cache of a remote processor.

As shown in FIG. 3, each child process 301 now enters a data acquisition loop. In this loop the child process activates the PMU 304 and then sleeps waiting for a signal indicating that the number of requested DEAR events has been counted. The child process is awakened by a signal initiated by the PMU 306 when the requested number of DEAR events has occurred. The child process reads 308 the DEAR data register 332 which contains DEAR status information, the instruction virtual address of the memory reference instruction that initiated the load miss, its latency, and the virtual memory data address that missed all levels of the cache hierarchy. If the DEAR status information indicates that the contents are valid 310 the DEAR registers are combined 312 with the PID that corresponds to the process that was executing when the DEAR event was recorded, e.g., Records 0, 1, 2, 3, 4, ..., N−2, N−1 in 303, and the current interval timer counter (ITC) which provides a global time reference. The process table created by the parent process is searched to determine if the PID is known. If it doesn't exist a new process has been encountered. The child informs the parent process of this condition by sending a message through the pipe which indicates the encountering of a new process and its associated PID. Then the augmented DEAR record 303 (PID, ITC) is written to that segment of the shared memory segment, e.g., #0, #1, #2, ..., #N, etc., in 208 of FIG. 2, that has been reserved for the processor on which the child process is executing. The recorded sample count is incremented and then termination checks 314, e.g., exit conditions, are made. If the recorded sample counter is greater than or equal to the requested count, or if the profiling time is equal or greater than the requested time a termination condition exists. If the child process detects either termination condition it sends a message through the pipe to the parent process 322 indicating that it has completed its data collection and waits for a signal from the parent process that it is permitted to exit 324. When the child receives the OK to exit signal the child prepares it exit status and then exits returning its exit status for the parent process to read when it receives the child processes exit signal.

If neither above condition is satisfied the child calculates the DEAR event signal rate 316. If the rate is excessive 318 the DEAR count is increased to bring the rate within an acceptable range 320, e.g., update PMU. If the rate is too low the DEAR count is decreased, e.g., update PMU 320, to achieve a rate within the range specified by the parent process. This adaptation of rates is worthwhile when doing system level monitoring as there is the potential for very large variance in cache miss rates as the load on the system varies in time. This is in effect dynamically changing the sampling rate which would distort any profile generated from the sample data. However, the augmented DEAR record 303 also includes the DEAR count per sample so it is possible to adjust sample weight when computing the profile to eliminate any distortion resulting from the variable sample rate.

During the data acquisition process the parent is normally sleeping waiting on a message to arrive at the read port of the communication pipe. There are two basic messages that the parent is expecting to receive on the pipe, i.e., New_PID and DONE. If the New_PID message is received then parent looks up the PID in the process table. If PID is found it means that the parent was previously informed of the existence of the new process so no further action is required. If it is not found it obtains the process information (PID, PPID, Priority, RID table, Command/Object, etc) from the operating system and inserts a new process entry containing this information into the process table. Once this is completed the parent again posts a read on the receive channel of the communications port causing it to sleep until another message is received.

If the parent receives a DONE message it records the fact that the child process has completed it task and is requesting permission to exit. The parent then signals the child that it is OK to exit 324 and records the status information when the child exit signal is received. The parent process checks its list of active child processes after each DONE message has been received. When all child processes have completed their data acquisition tasks the parent begins reducing the data collected by the child processes.

Figures 4, 4A:
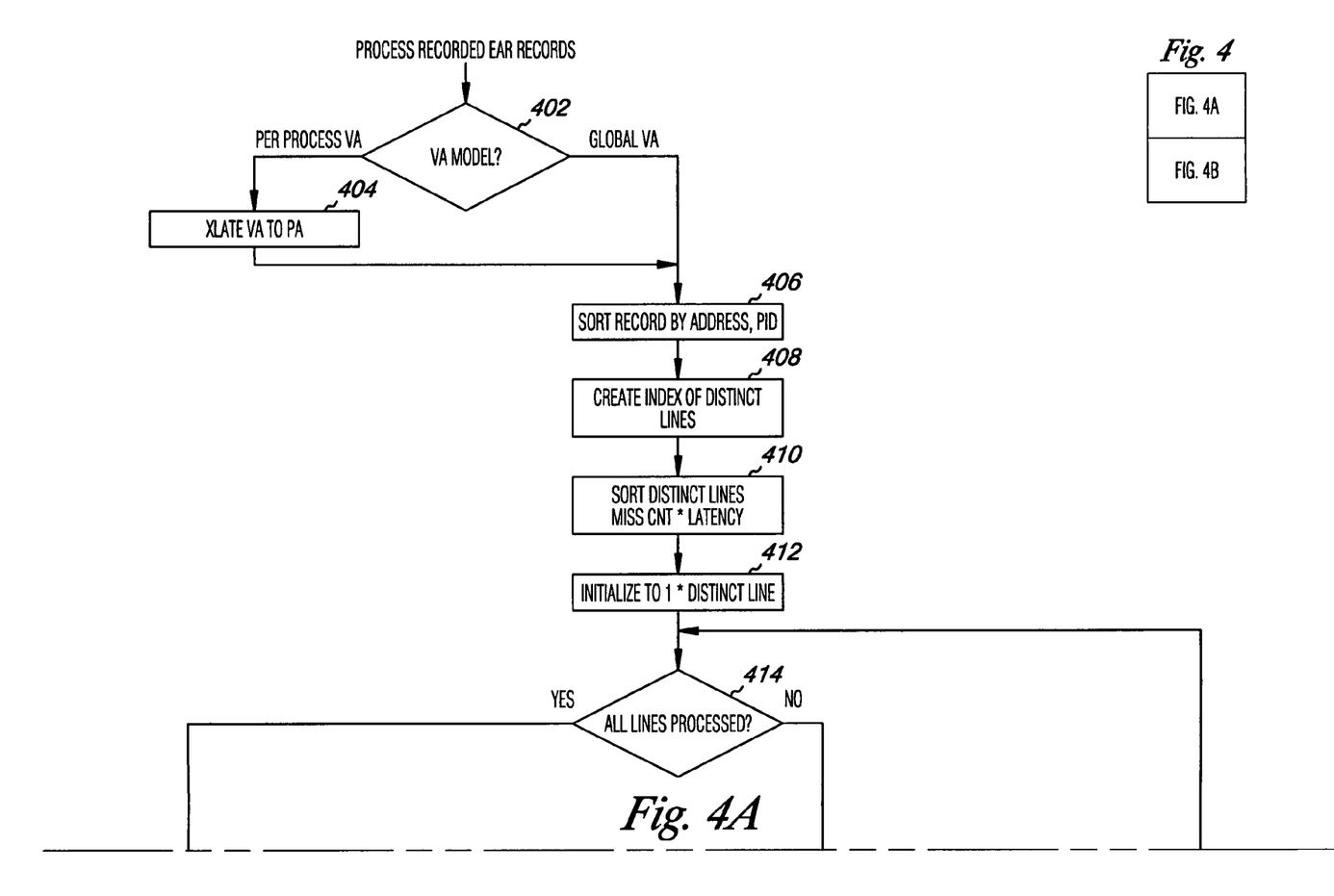
FIGS. 4A-4B illustrates a method embodiment for processing event address register (EAR) records according to the present disclosure.
Figure 4B:
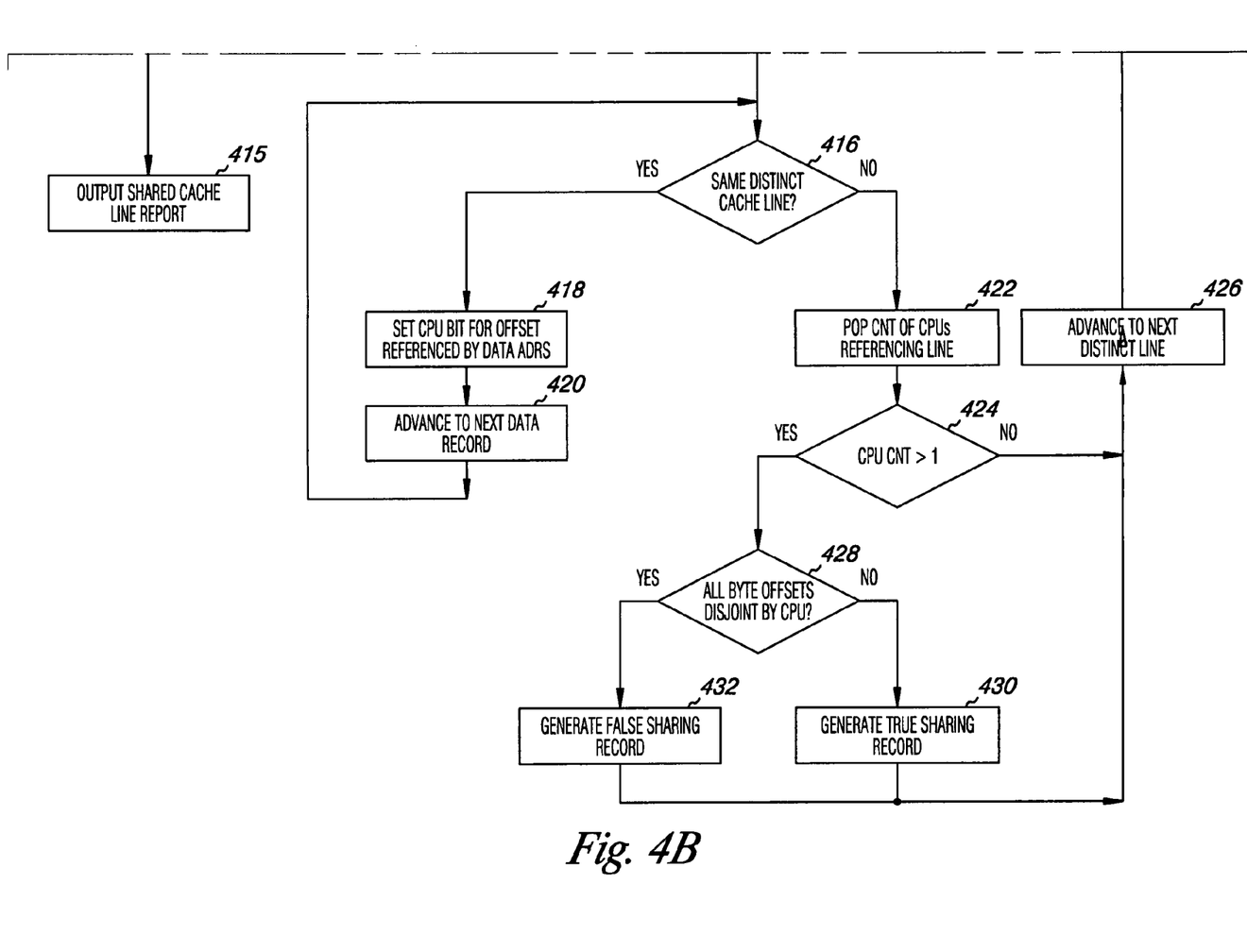

FIGS. 4A-4B illustrates a method embodiment for processing data event address register (DEAR) records according to the present disclosure. At this point the parent process begins reduction of the augmented DEAR events that had been recorded by the child processes. The first step in this process is to build an index over all the DEAR records for all processors in the shared memory segment. These had previously been recorded by the now terminated child processes. As shown in FIG. 4A, the processing may also begin with determining the virtual address (VA) model of the system 402. If the VA model is a per process VA approach then the embodiments may execute to translate the VA to a physical address (PA) 404. In a global VA model the processing may proceed straight to block 406.

As shown at block 406, using the index array, the DEAR records are sorted by data address, then PID and then by processor number, e.g., compound key of Data ADRS, PID, and processor number. The sorted records are then scanned to determine the number of DEAR records that are associated with memory addresses that are shareable, as defined by the virtual address (VA) model of the system, and the number of "distinct memory cache lines" (shown in more detail in FIG. 5) that are represented. As noted above, the indexing, sorting, and scanning process is operating system dependent. Hence, for a global virtual address (VA) space operating system the indexing, sorting, and scanning can be unambiguously determined by examining the virtual address. However, for per process virtual address space operating systems the virtual address is translated into a physical address 404 and then the combined PID/PHYS_ADRS is used as a surrogate virtual address.

As shown at block 408 in FIG. 4A, once the number of distinct shareable memory cache lines is known an index array is created and initialized to point to each of the DEAR records that represents a new distinct shareable memory cache line. The index array also contains the fields for the number of misses collected for the distinct memory cache line and the number of processors that participated in accessing the distinct memory cache line (shown in more detail in FIG. 7). These fields are filled in during the initialization of index array which is done by scanning through all shareable DEAR records, marking the beginning of the address sorted DEAR records. As the DEAR records are scanned within each distinct memory cache line the number of misses is accumulated along with the number of distinct processors that had cache miss references to this distinct line 410. As shown at block 412, when a new distinct memory cache line is encountered the current miss count and processor count fields for the previous distinct line are updated and reset to give these tabulations for the new distinct line.

Figure 5:
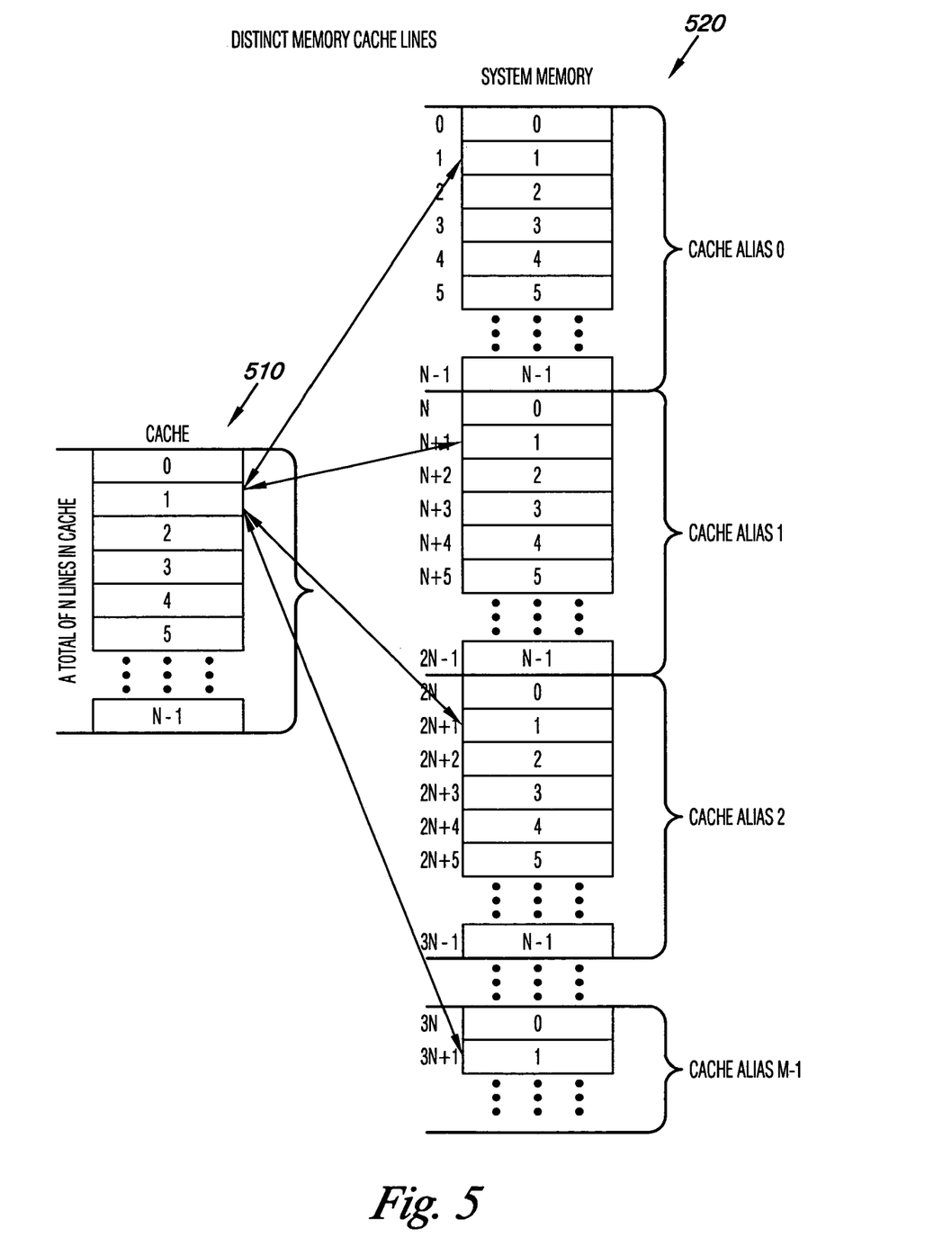
FIG. 5 illustrates a relationship between cache lines in cache memory and distinct memory lines in system memory to illustrate distinct memory cache lines according to embodiments of the present disclosure.

Referencing FIG. 5, an illustration is provided which shows a relationship between cache lines, 0, 1, 2, 3, 4, 5, ..., N−1, in cache memory 510 and distinct memory lines, 0, 1, 2, 3, 4, 5, ..., N−1, in system memory 520 to illustrate distinct memory cache lines according to embodiments of the present disclosure. As shown in FIG. 5, numerous distinct memory lines may map into a particular cache line, but at any given time each cache line will only map to a single memory line. Distinct memory cache line is intended to mean the cache size memory segment address and not the cache line address. Thus, in the example of FIG. 5, distinct memory cache line addressed 1 (in cache alias 0), N+1 (in cache alias 1), 2N+1 (in cache alias 2), and 3N+1 (in cache alias M−1) all map into cache line address 1. In FIG. 5 it is assumed that the memory size is an integral multiple (M) of the cache size in bytes.

Figure 6:
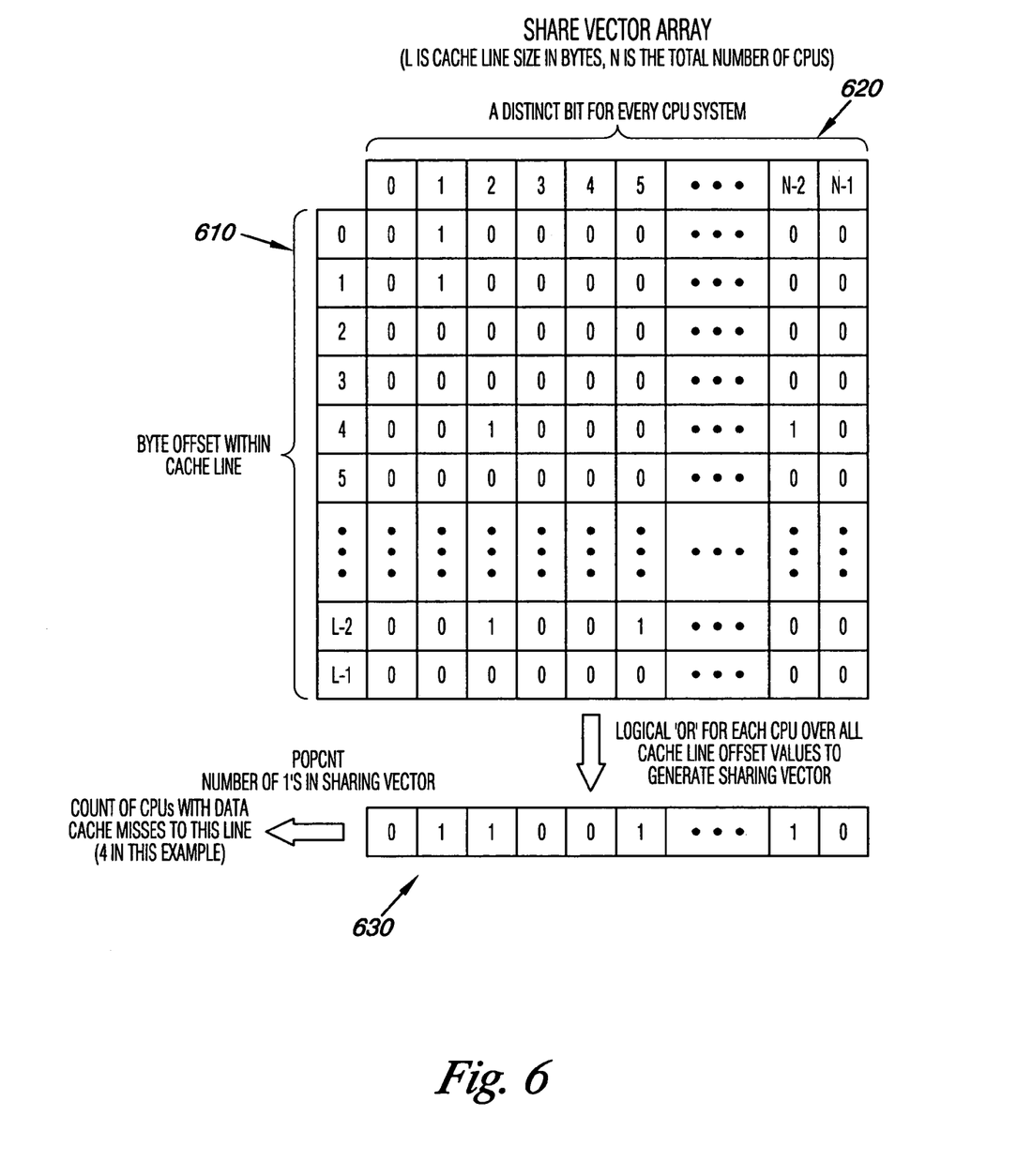
FIG. 6 illustrates a share vector array according to embodiments of the present disclosure.

Determining whether a line is shared is performed by using an array of bit vectors (shown in more detail in FIG. 6). Referencing FIG. 6 an illustration is provided of a share vector array according to embodiments of the present disclosure. The share vector array is basically a two dimensional array with one dimension 620 being a bit vector with a distinct bit representing each distinct processor, 0, 1, 2, 3, ..., N−1, ("N" is the total number of processors) in the system. The second dimension represents the cache line byte offset address 610 for each byte address, 0, 1, 2, 3, ..., L−1, ("L" is the cache line size in bytes) within a cache line. This structure is used to help identify the number of processors that are sharing a specific cache line.

Returning to FIG. 4A, from initializing to 1* a distinct cache line, program instructions execute to determine whether all lines have been processed. As shown in FIG. 4B, if all lines have been processed a report of shared cache lines is output 415. If not, the program instructions execute to determine whether the current cache line is the same distinct cache line. Within each distinct memory cache line the DEAR records associated with the line are scanned. The data address and processor number from the DEAR record is used to update the array of bit vectors. This is accomplished by using those bits of the data address that define the cache line size, i.e., these are the bits that do not directly index the cache but rather act as byte offset within the cache. For the current IPF processors the line size "L" for the largest cache in the hierarchy is 128 bytes. Currently there are 7 bits of byte offset address that span the range of 0-127 thus the array of bit vector actually contains 128 processor bit vectors, however the technique can be applied to an arbitrary cache line size. The cache line byte offset value is used to select the processor bit vector that corresponds to the byte address offset within the cache line. The processor number is used to select the bit that represents this processor in the bit vector selected by the data address and sets its value to 1 as shown at block 418. This denotes that this processor observed a miss to this memory address. Program instructions then execute to advance to the next data record as shown at block 420. When all DEAR records corresponding to a distinct memory cache line address have been processed the information needed to identify sharing candidates can be identified using the array of bit vectors proceeding to block 422.

As shown in block 422 a population count of processor referencing a cache line is now performed. That is, the program instructions can execute to scan the array of bit vectors and perform a logical 'OR' function for each bit in the bit vector over the range of cache line offset values, 0, 1, 2, ..., L−1. As shown in FIG. 6, the result of this operation is a single vector 630 that has a bit for each processor, e.g., processors 1, 2, 5, and N−2 in the example illustration of FIG. 6, that observed a miss to this distinct memory cache line. In other words, the number of bits with a value of '1' in the share vector 630 is a count (POPCNT) of the number of processors that observed misses to this line. If the number of 1's recorded is greater than one then some form of sharing exists for this cache line and the method proceeds to block 428. If the number of 1's recorded is not greater than one then the method proceeds to block 426 where the program instructions execute to advance to the next distinct cache line.

As shown in block 428, program instructions execute to determine whether all byte offsets are disjoint by processor. If all byte offsets are not disjoint by processor then the program instructions execute to generate a "True" sharing record as shown in block 430 and the method can then proceed to block 426 to advance to the next distinct cache line. Alternatively if all byte offsets are disjoint by processor then the program instructions execute to generate a "False" sharing record and the method can then proceed to block 426 to advance to the next distinct cache line. According to various embodiments, if there is a combination of byte offsets which are not disjoint by processor and byte offsets which are disjoint by processor then program instructions can execute to use the miss count information (shown in FIG. 7) to discern whether a highly shared structure exist.

Figure 7:
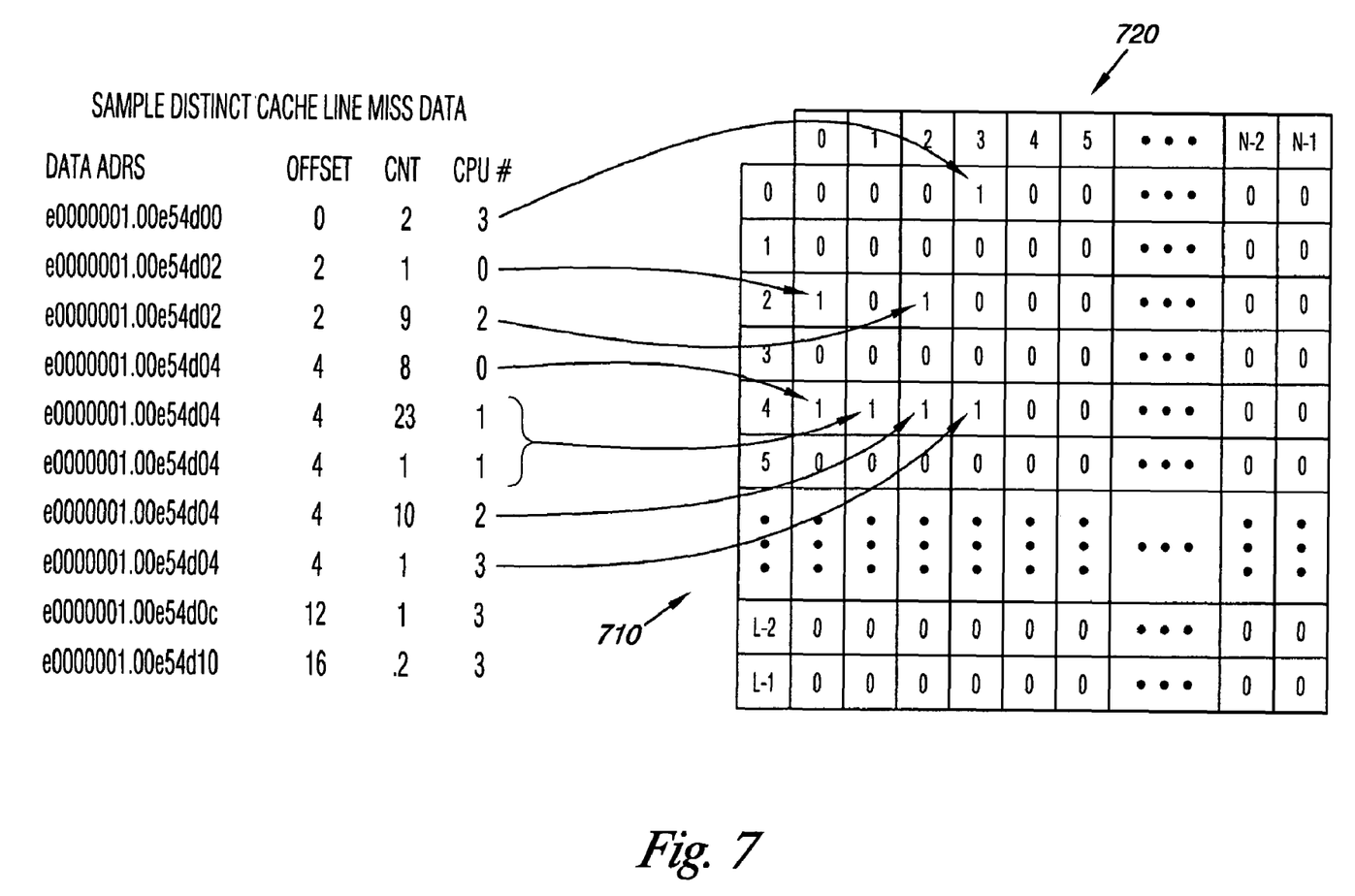
FIG. 7 illustrates example distinct cache line miss data in relation to the share vector array of FIG. 6 according to embodiments of the present disclosure.

FIG. 7 illustrates example distinct cache line miss data in relation to the share vector array of FIG. 6 according to embodiments of the present disclosure. FIG. 7 provides an illustration which shows how the various bits in the share vector array are set based upon the missed that are detected for each distinct cache line. FIG. 7, illustrates the manner is which the sample distinct cache line miss data is map into the array. As with FIG. 6, the cache line offset is the vertical index 710 and each processor number is the horizontal index 720.

FIG. 7 illustrates and example where there is a combination of byte offsets which are not disjoint by processor, e.g., byte offset 4 shared by processors 0, 1, 2, and 3 as well as byte offset 2 shared by processors 0 and 2, along with byte offsets which are disjoint by processor, e.g., byte offset 0.

Figure 8:
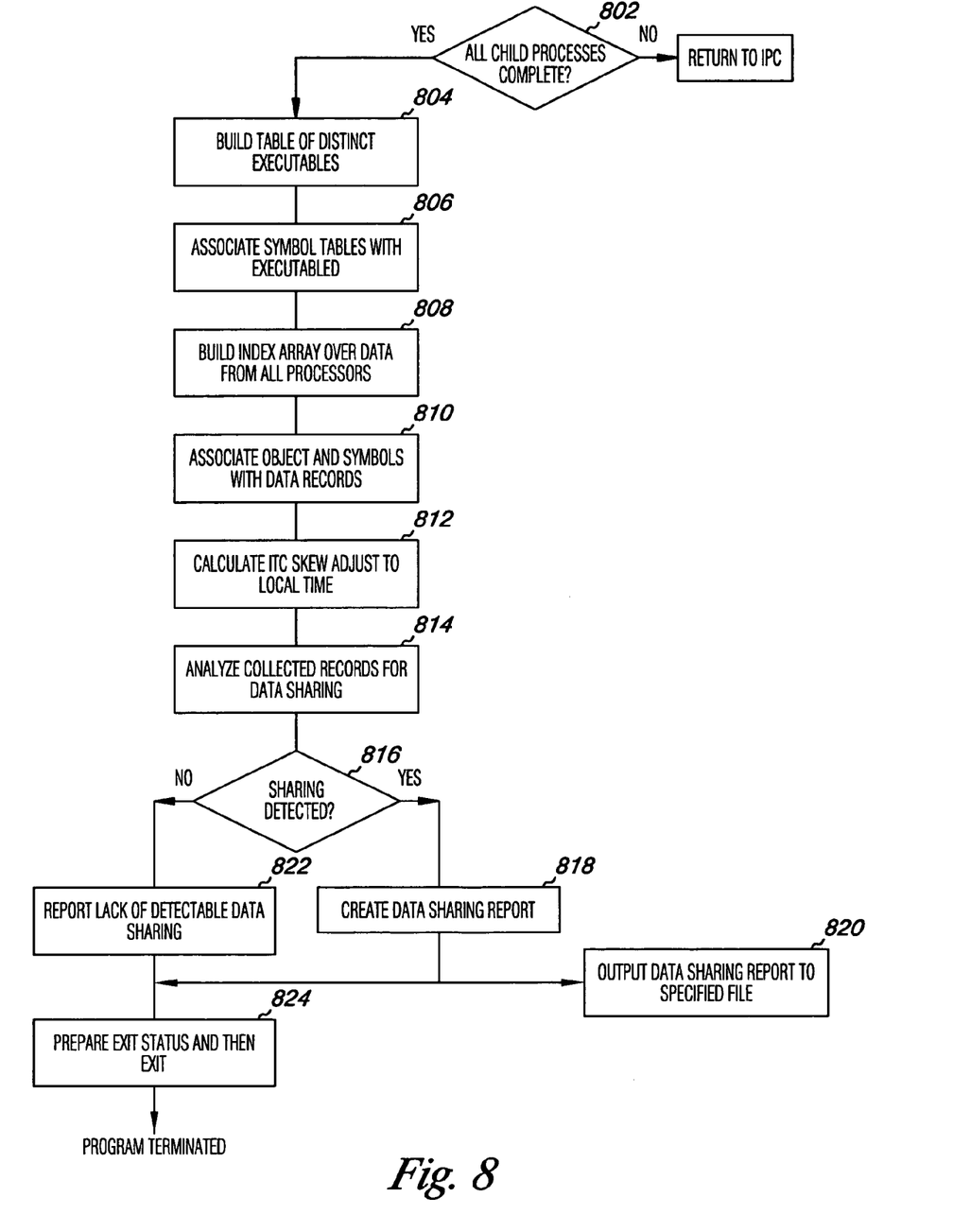
FIG. 8 illustrates a parent process flow chart according to an embodiment of the present disclosure.

FIG. 8 illustrates a parent process flow chart according to an embodiment of the present disclosure. At block 802, program instructions can execute to determine when all child processes are complete, e.g., have sent a termination signal to the parent process as described in connection with FIG. 2. If all the child processes are not complete then the parent process can return to the inter process communication (IPC). As shown in FIG. 8, when all child processes are complete program instructions associated with the parent process can execute to build a table of distinct executable as shown at block 804. At block 806, the parent process can associate symbol tables with the executables from block 804. The parent process then will build an index array over data from all processors in block 808. In block 810, the parent process associates objects and symbols with data records. At block 812, the parent process can calculate interval timer count (ITC) skew and adjust to local time. The parent process can then analyze collected records for data sharing.

At block 816, the program instructions execute to determine whether sharing was detected. If sharing was detected, then at block 818 the program instructions execute to create a data sharing report. At block 820, the program instructions can execute to output the data sharing report to a specified file and proceed to block 824 to prepare exit status and exit. Alternatively, if sharing was not detected, then at block 822 program instructions associated with the parent process can execute to report lack of detectable data sharing and proceed to block 824 to prepare exit status and exit.

Hence, according to various embodiments described herein, when all distinct memory cache lines have been processed a count of the total lines for which there was some form of sharing is available. Program instructions can then execute to create a new index array which is initialized to cover the distinct memory cache lines that have been identified as having some form of sharing. The records are sorted on the compound key of miss count, data address, processor number, and instruction address. The records that have the same instruction address, processor number, and data address are coalesced into a single record that includes a count of the total misses that have been observed to this address. This results in a sorted list of distinct memory cache lines that can be organized in descending ordered by miss count. For each distinct memory line there is are a number of coalesced records that provide summary statistics for each byte offset within the cache line for which a miss was recorded. The summary can include the data address, the miss count observed for this address, the number of processor that referenced this data address, the PID of the process from which the data reference was made and the instruction address within the executable from which the data reference was made.

The completed shared distinct memory cache line array of records can be scanned to classify sharing characteristics. For each distinct memory cache line the coalesced data address summary records associated with the distinct memory cache line being analyzed can be scanned. For each distinct data address a bit vector of processors that observed misses to this address can be created. The number of 1's in the bit vector is counted when all records for the current data address have been completed. If the count is one, then only a single processor referenced this address. The processing of the summary records is continued for the current distinct memory cache line. When all summary records have been completed, the total number of processors which referenced each data address within the current distinct memory cache line can be assessed. If the processor count for all summary records is one, then all the data references within the shared distinct memory cache line are distinct to individual processors. In this case the cache line is falsely shared amongst some number of processors, i.e., no data address within the current distinct memory cache line is common to more than one processor but multiple processors accessed this various distinct address within the line. If all data addresses, e.g., byte offsets, within the current distinct memory cache line is referenced by multiple processors then a instance of true sharing exist for the cache line.

When all distinct memory cache lines are analyzed a report can be generated that summarizes the sharing results. The output of the report can be comprised of a series of reports for each distinct memory line for which some form of sharing was encountered. The report could be viewed as a series of reports, one for each distinct memory cache. Each distinct cache line report begins with a distinct line contribution record. This record provides the miss contribution for this line as a function of all distinct memory cache lines and shared distinct memory cache lines as well as the respective cumulative contributions. As the reader will appreciate, this information is useful in ascertaining the impact that sharing of the current distinct memory cache line has on system performance. For example, if the contribution of all misses is large this would be an indicator that the data sharing with this distinct memory cache line should be examined. To aid this examination each distinct memory cache line is followed by the coalesced records of data accesses to this line. These records may contain the miss count, data address, processor number, instruction address, average latency to service the miss, the object/cmd that was executing when the miss was detected and the function name that is associated with the instruction address if the symbol table is available. For example, if the data address has a '*' prefix character then the identified data address was unique to a single processor. If all data address with a distinct memory cache line have a '*' prefix on the data address then a false sharing situation is present. In this case the distinct line summary record could have a '#' prefix on the memory cache line address as an explicit indicator of false sharing.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for a symmetric multiprocessor (SMP) system, comprising:
   creating a child process for each processor in the SMP;
   using an event address register (EAR) associated with each processor to record information relating to cache misses;
   combining operating system supplied information with the EAR records;
   analyzing the EAR records for each processor; and
   creating a bit vector for each byte of cache line that is shared by multiple processors.

2. The method of claim 1, wherein the method includes using the child process associated with each processor to configure a data EAR (DEAR) in a particular processor's performance monitoring unit (PMU) to record cache misses that are not serviced by cache local to the particular processor.

3. The method of claim 2, wherein the method includes recording the particular processor's DEAR information in a private array of a shared memory segment configured by a parent process.

4. The method of claim 3, wherein the method includes using each child process to record DEAR information according to a configurable time period and to send a termination signal the parent process.

5. The method of claim 3, wherein the method includes using each child process to record DEAR information until a particular number of records have been recorded and to send a termination signal the parent process.

6. The method of claim 5, wherein the method includes using the child process to record DEAR information when a DEAR signal is received by the child process.

7. The method of claim 6, wherein the method includes using the child process to evaluate a signaling rate of the associated processor to adjust DEAR parameters to maintain a particular overhead rate.

8. The method of claim 7, wherein, once the parent process receives the termination signal from each child process, the method includes:
    sorting recorded DEAR information by data address, processor identification, cache miss count, and instruction address information to produce a list of a number of distinct cache lines that were read; and
    using a virtual address space (VAS) model for a given operating system to create an index over the sorted DEAR information for the number of distinct cache lines that are candidates for being shared according to the VAS model for the given operating system.

9. A method for a symmetric multiprocessor (SMP) system, comprising:
    using a parent process to create a child process associated with each processor in the SMP;
    using each child process to configure a data event address register (DEAR) in a performance monitoring unit (PMU) for its associated processor in order to record cache misses that are not serviced by cache local to its associated processor;
    recording DEAR information associated with each processor in a private array of a shared memory segment configured by the parent process; and
    creating a bit vector for each byte of cache line that is shared by multiple processors.

10. The method of claim 9, wherein each child process is normally sleeping and the method includes running each child process when an associated DEAR signals that a cache miss record is available.

11. The method of claim 10, wherein, when an associated DEAR signal is received, using the associated child process to evaluate a signaling rate of the associated processor and adjust DEAR parameters to maintain a particular overhead rate.

12. The method of claim 11, wherein the method includes using each child process to record DEAR information until a particular number of cache miss records have been recorded, and to send a termination signal the parent process when the particular number of cache miss records have been recorded.

13. The method of claim 12, wherein, when the termination signal has been received from each child process, using the parent process to analyze the DEAR records associated with each processor.

14. A computer readable medium having executable instructions thereon for causing a symmetric multiprocessor (SMP) system to perform a method, comprising:
    using a parent process to create a child process associated with each processor in the SMP;
    using each child process to configure a data event address register (DEAR) in a performance monitoring unit (PMU) for its associated processor in order to record cache misses that are not serviced by cache local to its associated processor;
    running each child process when an associated DEAR signals that a cache miss record is available;
    using the associated child process to evaluate a signaling rate of the associated processor and adjust DEAR parameters to maintain a particular overhead rate;
    recording DEAR information associated with each processor in a private array of a shared memory segment configured by the parent process;
    sending a termination signal from each child process to the parent process when a particular number of cache miss records have been recorded;
    using the parent process to analyze the DEAR records associated with each processor, when a termination signal has been received from each child process; and
    creating a bit vector for each byte of cache line that is shared by multiple processors.

15. The medium of claim 14, wherein using the parent process to analyze the DEAR records includes:
    sorting distinct sharable cache lines by data address, miss count, processor count, and instruction address information to produce an index list of a number of distinct memory cache lines that were shared by multiple processors, wherein the bit vector records all processors that referenced any byte within a distinct memory cache line;
    scanning the DEAR records for each shared distinct memory cache line; and
    when all DEAR records associated with a current distinct memory cache line have been scanned, performing a population count for each bit vector associated with a byte address within a cache line.

16. The medium of claim 15, wherein the method includes generating a sharing report, wherein generating a sharing report includes:
    identifying a false sharing if all byte addresses are distinct to individual processors;
    identifying a true sharing if all offsets used are seen by multiple processors; and
    when there is a combination of a number of byte being distinct to individual processors and a number of offset being seen by multiple processors, using cache miss count information to discern whether a highly shared structure exist.

17. A symmetric multiprocessor (SMP) system, comprising:
    a processor;
    a memory in communication with the processor; and
    program instructions storable in memory and executable by the processor that:
        create a child process for each processor in the SMP;
        use an event address register (EAR) associated with each processor to record information relating to cache misses;
        analyze the EAR records for each processor; and
        create a bit vector for each byte of cache line that is shared by multiple processors.

18. The system of claim 17, wherein the program instructions can execute such that the child process associated with each processor configures a data EAR (DEAR) in a performance monitoring unit (PMU) for its associated processor to record cache misses that are not serviced by cache local to its associated processor.

19. The system of claim 18, wherein the program instructions can execute to record the particular processor's DEAR information in a private array of a shared memory segment configured by a parent process.

20. The system of claim 19, wherein the program instructions can execute to have each child process to record DEAR information until a particular event.

21. The system of claim 20, wherein the particular event is an expiration of a configurable time period.

22. The system of claim 20, wherein the particular event is when a particular number of DEAR records have been recorded.

23. The system of claim 20, wherein the program instructions can execute to have each child process send a termination signal the parent process upon occurrence of the particular event.

24. The system of claim 23, wherein the program instructions can execute to have the child process to record DEAR information when a DEAR signal is received by the child process.

25. The system of claim 24, wherein the program instructions can execute to have the child process to evaluate a signaling rate of the associated processor to adjust DEAR parameters to maintain a particular overhead rate.

26. The system of claim 25, wherein, once the parent process receives the termination signal from each child process, the program instructions can execute to:
 sort recorded DEAR information by data address, processor identification, cache miss count, and instruction address information to produce an list of a number of distinct cache lines that were read; and
 use a virtual address space (VAS) model for a given operating system to create an index over the sorted DEAR information for distinct sharable cache lines according to the VAS model for the given operating system.

27. The system of claim 26, wherein the program instructions are executable that:
 sort the distinct sharable cache lines by data address, miss count, processor count, and instruction address information to produce an index list of a number of distinct memory cache lines that were shared by multiple processors;
 create a bit vector for each byte of cache line that is shared by multiple processors across the system, wherein the bit vector records all processors that referenced any byte within a distinct memory cache line;
 scan the DEAR records for each shared distinct memory cache line; and
 when all DEAR records associated with a current distinct memory cache line have been scanned, perform a population count for each bit vector associated with a byte address within a cache line.

28. The system of claim 26, wherein the program instructions are executable to generate a sharing report, wherein in generating the sharing report the program instructions can execute that:
 identify a false sharing if all byte addresses are distinct to individual processors;
 identify a true sharing if all offsets used are seen by multiple processors; and
 when there is a combination of a number of byte being distinct to individual processors and a number of offset being seen by multiple processors, use cache miss count information to discern whether a highly shared structure exist.

29. A symmetric multiprocessor (SMP) system, comprising:
 a processor;
 a memory in communication with the processor; and
 Executable instructions stored on the memory and executed by the processor that:
  create a child process for each processor in the SMP;
  use an event address register (EAR) associated with each processor to record information relating to cache misses;
  combine operating system supplied information with the EAR records;
  analyze the EAR records for each processor; and
  create a bit vector for each byte of cache line that is shared by multiple processors across the system in order to non obtrusively identify true/false data sharing in the SMP without compiler inserted instrumentation or customer site instrumented software installation.

* * * * *